(12) United States Patent
Brace et al.

(10) Patent No.: US 7,631,082 B2
(45) Date of Patent: Dec. 8, 2009

(54) TRANSPARENT RESOURCE ADMINISTRATION USING A READ-ONLY DOMAIN CONTROLLER

(75) Inventors: Colin Harrison Brace, Seattle, WA (US); William S. Jack, III, Redmond, WA (US); Nathan Daniel Muggli, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 953 days.

(21) Appl. No.: 11/149,650

(22) Filed: Jun. 10, 2005

(65) Prior Publication Data

US 2006/0280139 A1 Dec. 14, 2006

(51) Int. Cl.
*G06F 15/173* (2006.01)

(52) U.S. Cl. ........................ 709/226; 709/225; 709/203; 709/217

(58) Field of Classification Search ......... 709/225–226, 709/203, 249, 217–219
See application file for complete search history.

(56) References Cited

U.S. PATENT DOCUMENTS

| | | | | |
|---|---|---|---|---|
| 5,867,667 | A * | 2/1999 | Butman et al. .............. | 709/249 |
| 5,978,813 | A * | 11/1999 | Foltz et al. .................. | 707/201 |
| 6,311,205 | B1 * | 10/2001 | Dutcher et al. .............. | 709/224 |
| 6,418,466 | B1 * | 7/2002 | Bertram et al. ............. | 709/221 |
| 6,457,053 | B1 | 9/2002 | Satagopan et al. .......... | 709/226 |
| 6,535,917 | B1 * | 3/2003 | Zamanzadeh et al. ........ | 709/225 |
| 2001/0047282 | A1 | 11/2001 | Raveis, Jr. ..................... | 705/7 |
| 2002/0095497 | A1 * | 7/2002 | Satagopan et al. .......... | 709/225 |
| 2002/0138577 | A1 * | 9/2002 | Teng et al. ................... | 709/205 |
| 2003/0065954 | A1 | 4/2003 | O'Neill et al. ............... | 713/202 |
| 2004/0098446 | A1 | 5/2004 | Styles et al. ................. | 709/200 |
| 2004/0210767 | A1 * | 10/2004 | Sinclair et al. .............. | 709/220 |
| 2004/0215650 | A1 * | 10/2004 | Shaji et al. .................. | 707/102 |
| 2006/0130065 | A1 * | 6/2006 | Chin et al. ................... | 718/104 |
| 2006/0224891 | A1 * | 10/2006 | Ilac et al. ..................... | 713/171 |
| 2008/0046973 | A1 * | 2/2008 | Jorgensen ....................... | 726/4 |

FOREIGN PATENT DOCUMENTS

| | | |
|---|---|---|
| GB | 2397904 | 8/2004 |
| WO | WO 00/16190 | 3/2000 |

* cited by examiner

*Primary Examiner*—Philip B Tran
(74) *Attorney, Agent, or Firm*—Workman Nydegger

(57) ABSTRACT

A domain controller hierarchy in accordance with implementations of the present invention involves one or more local domain controllers, such as one or more read-only local domain controllers in communication with one or more writable hub domain controllers. The local domain controllers includes a resource manager, such as a Security Account Manager ("SAM"), that manages resources and/or other accounts information received from the writable hub domain controller. When a local user attempts to change the resource at the local domain controller, however, the resource manager chains the request, along with any appropriate identifiers for the request, to the writable hub domain controller, where the request is processed. If appropriate, the hub domain controller sends a response that the resource has been updated as requested and also sends a copy of the updated resource to be cached at the local domain controller.

19 Claims, 3 Drawing Sheets

TRANSPARENT RESOURCE ADMINISTRATION USING A READ-ONLY DOMAIN CONTROLLER

CROSS-REFERENCE TO RELATED APPLICATIONS

N/A

TECHNICAL FIELD

This invention relates to systems, methods, and computer program products for managing resources among domain controllers.

BACKGROUND

As computerized systems have increased in popularity, so have the needs to distribute files and processing resources of computer systems in networks both large and small. In general, computer systems and related devices communicate information over a network for a variety of reasons, for example, to exchange personal electronic messages, sell merchandise, provide account information, and so forth. One will appreciate, however, that as computer systems and their related applications have become increasingly more sophisticated, the challenges associated with sharing data and resources on a network have also increased.

Generally, there are a number of different mechanisms and protocols for distributing resources among computer systems. For example, two or more computers in a corporate network can share resources, such as files, application programs, or the like, over, for example, a Local Area Network ("LAN"), or a Wide Area Network ("WAN"). The computers can share these resources using any number of currently available transmit and receive communication protocols established between them.

More complicated schematics for sharing resources on a network include, for example, a domain controller hierarchy scheme, which is used in some implementations to organize and share both secure and non-secure resources in an efficient manner. For example, a central hub domain controller might be used to manage user names, passwords, computer names, network identifiers, or the like, and provide the information through a hierarchy of remote and local servers (i.e., local domain controllers). The various domain controllers, in turn, are configured with a resource manager, such as a Security Account Manager ("SAM"), which provides interfaces and protocols for storing or authenticating resources in the domain. When one or more individual client computer systems requests a resource, the request may be handled by a local domain controller based on a policy provided by a higher level computer in the domain.

In one example, a large pharmaceutical company that has several local branch offices (e.g., neighborhood pharmacies), might want to establish a local domain controller at each of the different local pharmacies. The company might do so by establishing a domain controller at each branch office. Each different branch office might therefore be part of a sub-domain in the hierarchy, or might even represent its own individual sub-domain of yet another sub-domain in the company's domain hierarchy. The established domain controller is typically configured for, among other things, operating in accordance with resource guidelines pushed downward from the centralized hub domain controller.

In this example, the hub domain controller might be "writable" or configured to be written-to by an administrator in the main organization. By contrast, the local domain controllers to which the central writable domain controller connect in this example, however, might be "read-only", and not therefore configured to be written-to in any meaningful way by the local users, or sometimes even the network administrator. In such an example, each local domain controller would be configured primarily to operate in accordance with guidelines provided by the writable domain controller. For user requests, the local domain might also be configured simply to relay the user requests to the writable hub domain controller, and then pass along the relevant account approval information sent back from the hub domain controller. For example, a user logs onto a client machine, and the local domain controller forwards the request to the hub domain controller for authentication. If the hub domain controller verifies the user's entered information, the hub domain controller instructs the local domain controller to allow the user to logon to the client computer system.

While this example schematic might have an advantage of being highly centralized, it also has a number of different difficulties, such as a low degree of local configurability (or none at all) for the various local domain controllers. For example, in order for a user to change a password (or reconfigure another resource), the user will usually need to contact an administrator managing the hub domain controller, who will then change the password (or resource) at the hub domain controller before the user can use the new password (or resource) at the local branch. That is, read-only domain controllers are typically unable to chain, or forward, secure account management requests from a user to hub domain controller.

Furthermore, although minimizing the amount of technical support staff needed at the local branch, this centralized domain controller schematic represents a single point of failure throughout the entire company's network. For example, when the hub domain controller is unavailable for any reason, users at the local branch might be unable to access a certain resource (e.g., logon to their respective client computer systems). That is, the local read-only domain controller will not store the relevant information from the hub domain controller that could be used to validate the client's request(s).

Alternative implementations to the foregoing examples include local and hub domain controllers that are each writable. Under this type of schematic, the hub domain controller sends not just resource configuration information, but also security account information for the company or organization, such that each local domain controller stores all security accounts for the company. Thus, when any user of the company logs onto any client machine at any local branch, the local domain controller, rather than the hub domain controller, authenticates the user(s), and provides client computer system access.

Since resources such as these are stored locally, the user may also be able to configure other resources at the local domain controller, such as the share-ability of a certain file, or access to another file system, or the like. Furthermore, an appropriately authorized user, can also change or update certain security account (or other configuration) information at the local domain controller, as opposed to changing this information by dealing with the network administrator of the hub domain controller. Changes at the user's local domain controller are then propagated throughout the other local and remote domain controllers in the hierarchy.

While this writable local and remote domain controller schematic has an advantage of decentralizing domain controller configurability and access, this schematic can also present other potential problems, such as security issues, when used in local branch offices that do not have trained technical support staff. For example, there is a heightened risk that one of the local users at a local branch might inadvertently modify a resource at the local domain controller that should not be modified. This is possible in part since many resources in present operating systems now come with a high degree of configuration granularity, which is difficult, if not impossible, for many non-technical branch users to successfully navigate. If there is no local technical support when a configuration mistake is made, the local branch might have to wait until a trained network administrator can fix the problem on-site, or fix it over the company's network as available.

One can appreciate that the writable local and remote domain controller schematic also presents a variety of exposure concerns. For example, the local domain controllers in the prior example may be accessible by other local domain controllers on the company network, and sometimes also by others on an outside, non-corporate network (e.g., Internet). Furthermore, the writable local domain controllers can present heightened security risks due to physical intrusion concerns, since, as a practical matter, organizations tend not to place the local domain controllers in physical secure locations. That is, the organization may want the benefits of a writable local domain controller, but not want to expend the resources to guard against virtual and physical security risks. Such physical risks can include removal or replacement of server hardware (e.g., hard drives, and the like).

As such, a number of difficulties can be found both with schematics with one writable domain controller and those with all domain controllers being writable, particular when implemented in branch locations that are separated from a head office location.

BRIEF SUMMARY OF SELECTED EMBODIMENTS

The present invention solves one or more of the foregoing problems with systems, methods, and computer program products configured to allow for the handling of security account management through a local read-only domain controller. In particular, implementations of the present invention relate to a local read-only domain controller receiving a request for account management from a local user, and implementing one or more application program interfaces to chain, or forward, the request to a writable hub domain controller for processing. The local domain controller also responds to the local user with a success or failure message, such that the local user is unaware that the writable hub domain controller was actually the computer system handling and processing the actual request.

For example, one method in accordance with an implementation of the present invention from the read-only domain controller perspective involves receiving a request from an accessor to change a resource. The read-only domain controller then identifies that the request involves a write operation, and forwards the request to a writable hub domain controller. If the writable hub domain controller is able to process the request for a change in the resource successfully, the read-only domain controller will also receive into cache a copy of a changed version of the resource from the writable hub domain controller. Furthermore, the read-only domain controller will send a reply to the accessor that the resource has been changed. Thus, the accessor is unaware that the resource was changed at the writable hub domain controller since the interaction of requesting and granting of request was done primarily between the accessor and the read-only domain controller.

A method in accordance with an implementation of the present invention from the writable hub domain controller perspective involves receiving a request from a read-only domain controller for a change in a resource, where the request comprises an identifier for the read-only domain controller. The writable hub domain controller also identifies that the read-only domain controller is authorized to make the request on behalf of an accessor initiating the request, and identifies that the accessor is authorized to change the resource. As appropriate, the writable hub domain controller then changes the resource, and sends a reply message to the read-only domain controller that the resource has been changed.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF EMBODIMENTS

The present invention extends to systems, methods, and computer program products configured to allow for the handling of security account management through a local read-only domain controller. In particular, implementations of the present invention relate to a local read-only domain controller receiving a request for account management from a local user, and implementing one or more application program interfaces to chain, or forward, the request to a writable hub domain controller for processing. The local domain controller also responds to the local user with a success or failure message, such that the local user is unaware that the writable hub domain controller was actually the computer system handling and processing the actual request.

Accordingly, and as will be understood more fully from the following description and claims, a domain controller hierarchy can be implemented with writable hub domain controllers that interact with one or more local read-only domain controllers. This provides a number of advantages, at least in part related to security issues at the local level, as well as ease of management. For example, a read-only domain controller is typically less prone to inadvertent or malicious access that could alter configuration resources or comprise sensitive account information. Thus, an organization can realize the benefits of using local domain controllers that have advantages associated with both conventional read-only local domain controllers, and with writable local domain controllers.

Figure 1A:
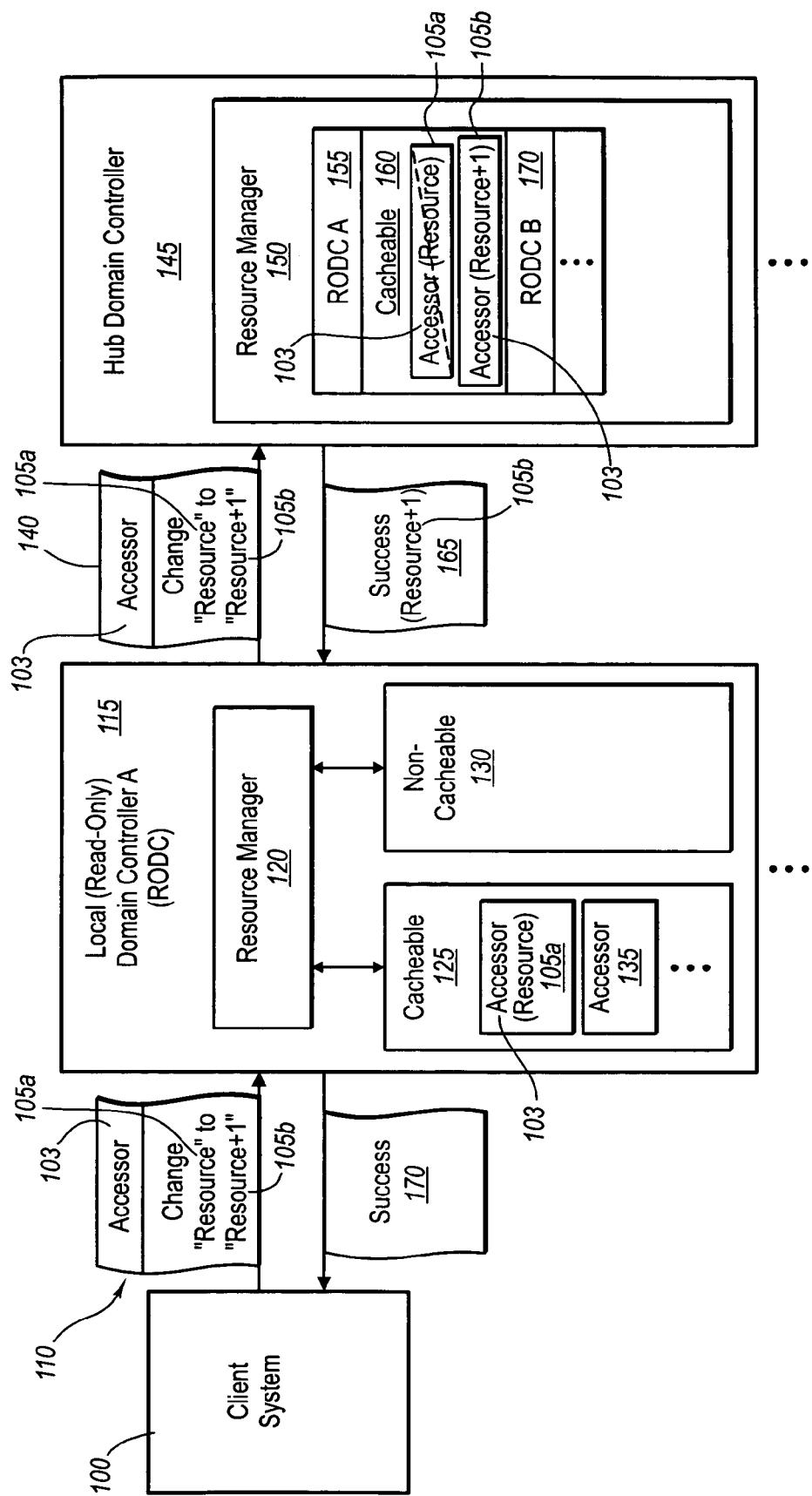
FIG. 1A illustrates an overview schematic diagram in accordance with an implementation of the present invention having a local read-only domain controller and a writable hub domain controller, wherein a local user is able to manage a resource through the read-only domain controller.

For example, FIG. 1A shows a system in accordance with an implementation of the present invention that includes a client computer system 100 connected to a local read-only domain controller A 115 (i.e., "local domain controller A" or "RODC A"). In one implementation, the client computer system 100 and local domain controller A 115 are each found in a branch office (not shown), such as a local neighborhood pharmacy that is part of large pharmaceutical organization. The local domain controller A 115, however, need not necessarily be located in the same physical location as the client computer system 100, and there may also be more than one local domain controllers located at the given branch location. FIG. 1A also shows that a hub domain controller 145 is connected to the local domain controller A 115 over a network. In some cases, the hub domain controller 145 is also located at the branch location, particularly where there may be several levels of hub domain controllers in the domain controller hierarchy. Nevertheless, however, the hub domain controller 145 will normally be present at a remote location.

FIG. 1A also shows that an accessor request 110 is sent from the client computer system 100 to the local domain controller A 115. This can occur in many different ways. For example, a user (not shown) accesses the client computer system 100 and initiates a request to change a resource, such as a password or other such information in the user's account. Alternatively, an application at the client computer system 100 requests a change for the computer systems 100, such as a password change, a change of name on the network, a change of domain (i.e., joining a new domain), or needs to change some other configuration resource. Accordingly, the client computer system 100 sends message 110 via a remote procedure call (or "RPC") on behalf of the relevant accessor 103.

As shown, message 110 includes an identity for the accessor 103, as well as a request to change the resource, such as changing from "Resource" 105a to "Resource+1" 105b. The message 110 is then sent to the local domain controller A 115, where one or more application program interfaces make one or more corresponding determinations about the request based on domain policy. For example, a resource manager 120, such as a Security Account Manager (or "SAM") at the local domain controller, identifies that the request 110 involves a "write" operation on a secure resource. Since the local domain controller is configured primarily for read operations with respect to local accessors, the local domain controller therefore determines that it cannot independently handle the request 110. That is, the local domain controller determines that it will need to involve a writable domain controller to complete the request.

The resource manager 120 also identifies that write functions for this type of resource can be "chained", or relayed to a writable hub domain controller. For example, the resource manager 120 might be configured to chain certain requests to a writable hub domain controller in some situations, but not in others. Furthermore, this configuration information may be unique to how the resource manager 120 is set up at local domain controller A 115. For example, each local domain controller in the domain controller system may be set up to have different chaining (or delegation) policies, such that certain functions at one branch can be chained, while these same functions might not be able to be chained by a different local domain controller.

In any event, assuming that the request is one that is appropriate or allowed for chaining, the resource manager 120 prepares to send the request to the hub domain controller 145 via message 140. To do so, the resource manager 120 calls a series of one or more handles to help with the request, where the one or more handles target the writable hub domain controller 145. For example, the resource manager 120 calls a handle to communicate with the writable hub domain controller 145. The resource manager 120 also calls one or more handles to write to any relevant accessor and/or resource objects. The resource manager 120 then prepares and passes message 140 to the hub domain controller 145.

Upon performing any appropriate authentication, the hub domain controller 145 then processes message 140 with its own resource manager 150, which involves calling a set of corresponding one or more APIs for the request. In one instance, an API at the resource manager 150 identifies that the local domain controller A 115 from which message 140 is sent corresponds to a partition 155 at the hub domain controller. If the resource manager 150 does not find any such partition, the hub domain controller 145 replies with an error.

Nevertheless, assuming the local domain controller sending the request is valid, the resource manager 150 processes the remainder of the request in message 140. In one implementation, for example, this processing includes determining that the local domain controller 115 can make the request on behalf of the accessor. For example, FIG. 1A shows that the accessor (e.g., user or client computer system 100) is part of a cacheable partition 160 in the RODC A partition 155. If the requesting accessor were in a non-cacheable group for the partition of RODC A 155, or if the requesting accessor were only in a non-matching, cacheable group, such as in a cacheable group for "RODC B 170", the resource manager 150 might deny the request. In any event, because the accessor of FIG. 1A is found in cacheable partition 160 for the valid RODC A partition, the resource manager 150 allows the resource 105a to be changed to resource 105b (i.e., to "Resource+1").

The resource manager 150 of the hub domain controller 145 then sends a success message 165 back to the local domain controller A 115. In at least one implementation, the resource manager 150 also sends the updated accessor account 105b (i.e., "Resource+1") back to the local domain controller A 115 so that the resource 105b can be cached at the local domain controller A 115 for subsequent actions by this accessor.

Figure 1B:
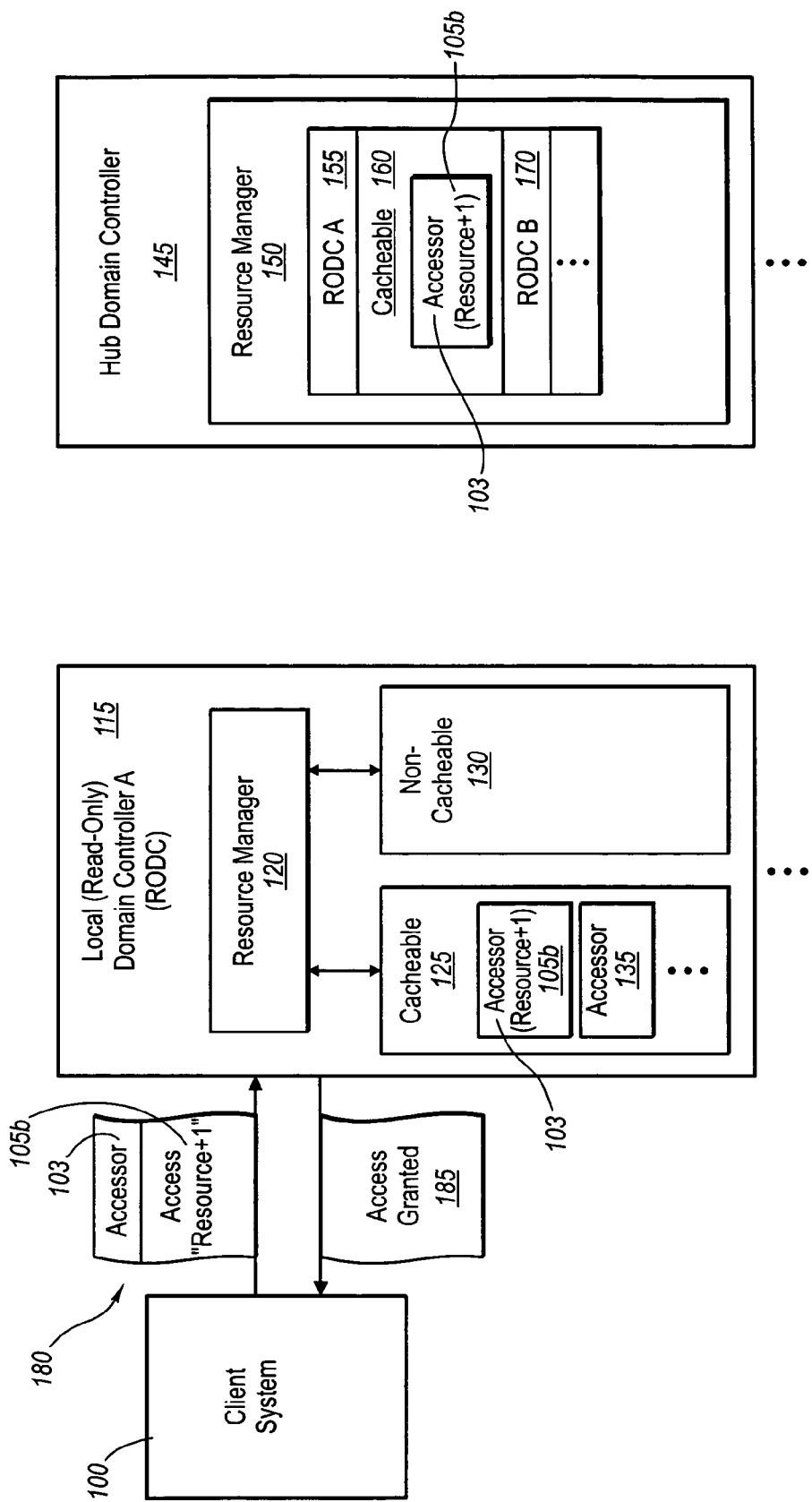
FIG. 1B illustrates the schematic diagram shown in FIG. 1A after the resource has been updated, and in which an accessor requests access of the updated resource through the local read-only domain controller.

For example, FIG. 1B shows the schematic of FIG. 1A after the resource has been updated to resource 105b, and the accessor attempts to access the resource. As shown, client computer system 100 sends a message 180 requesting access of "Resource+1" on behalf of accessor 103. The resource manager 120 at the local domain controller 115 then takes the message 180 and determines that the request is being processed at a local read-only domain controller 115. The resource manager 120, however, also identifies that the updated resource 105b is cached in the cacheable partition 125. Since resource 105b is found locally, the resource manager 120 does not have to open up any additional handles or interfaces to interact with the hub domain controller 145, but can simply grant access through message 185. Accordingly, the schematic diagrams in accordance with the present invention illustrate how one or more local read-only domain controllers can be implemented in a manner that provides one or more of the benefits of a writable local domain controller.

Figure 2:
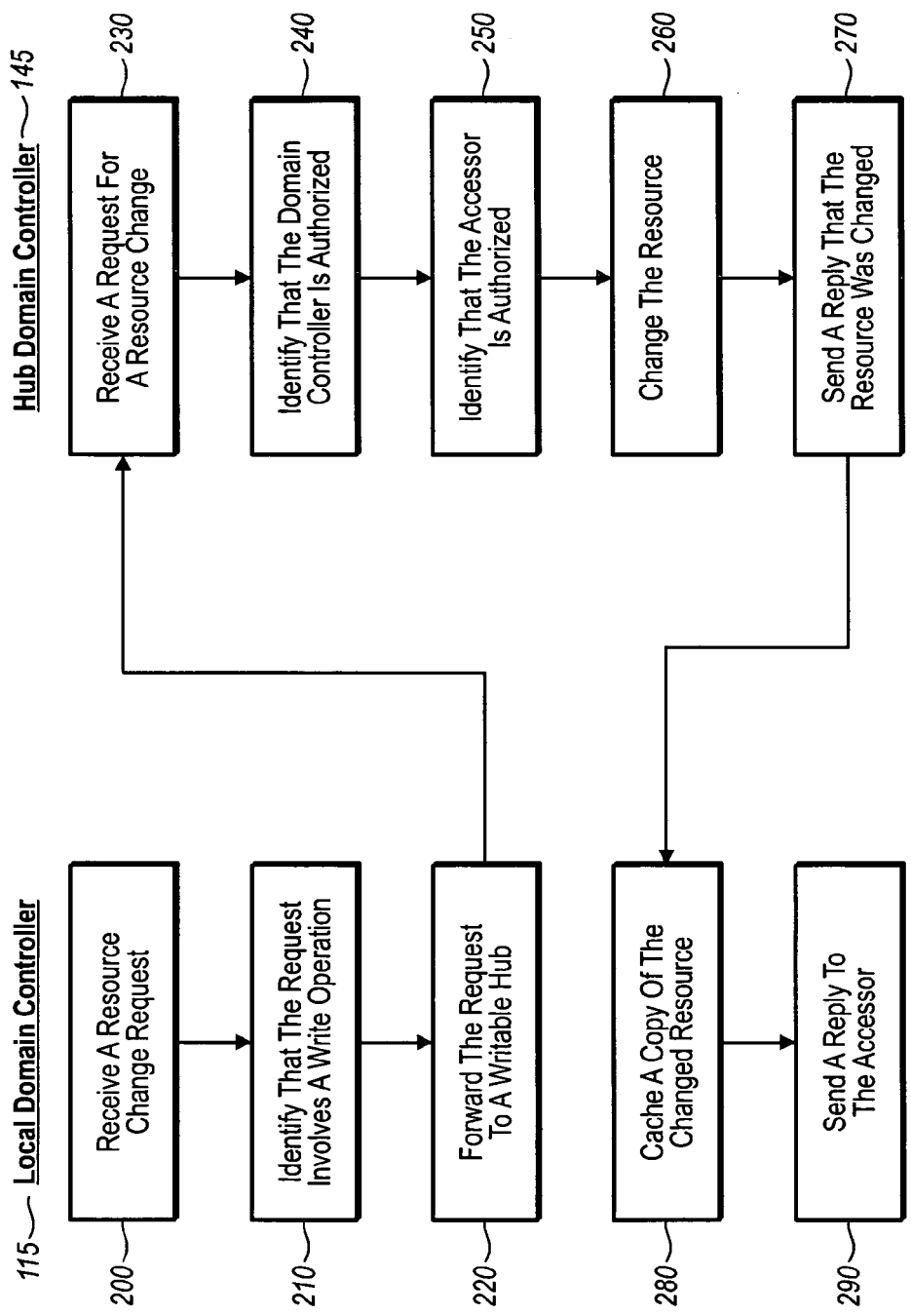
FIG. 2 illustrates acts in methods from the local domain controller perspective and from the hub domain controller perspective for handling a local request to change a resource.

The present invention can also be described in terms of acts for accomplishing one or more methods in accordance with an implementation of the present invention. For example, FIG. 2 illustrates flowcharts of series of acts from the perspective of the local domain controller 115 and from the perspective of the hub domain controller 145 for managing resources through a local read-only domain controller and a writable hub domain controller 145. The acts illustrated in FIG. 2 are described below with respect to the diagrams of FIGS. 1A and 1B.

For example, FIG. 2 shows that a method from the perspective of the local read-only domain controller 115 comprises an act 200 of receiving a resource change request. Act 200 includes receiving a request from an accessor to change a local resource. For example, client computer system 100 sends message 110, which bears the identity 105*a* of an accessor, and requests a change of a resource from "Resource" to "Resource+1". The message 110 is then received at the local domain controller 115 through a resource manager 120.

The method also comprises an act 210 of identifying that the request involves a write operation. Act 210 includes identifying that the request involves a write operation on the resource. For example, the resource manager 120 examines the request 110, and determines that the request involves a write operation that is not ordinarily handled by the local (read-only) domain controller. This determination of what operations can and cannot be forwarded is provided in advance by the hub domain controller The resource manager 120 150 authorizes the forwarding of the request to a writable hub domain controller 145 by resource manager 120 at the local read only domain controller 115, subject to any other local or otherwise domain-driven policies.

Accordingly, FIG. 2 also shows that the method comprises an act 220 of forwarding the request to a writable hub. Act 220 includes forwarding the request to a writable hub domain controller. For example, the resource manager 120 prepares a new message 140 that includes information for the local read-only domain controller's identity, and also includes the request information from the message 110, including the accessor identification, as well as the request for a resource change from 105*a* (i.e., "Resource") to 105*b* (i.e., "Resource+1").

Thus, FIG. 2 further shows that a method from the perspective of the hub domain controller 145 comprises an act 230 of receiving a request for a resource change. Act 230 includes receiving a request from a read-only domain controller for a change in a resource, wherein the request comprises an identifier for the read-only domain controller. For example, as shown in FIG. 1A, the hub domain controller 145 receives message 140 through the hub's resource manager 150. The resource manager 150 examines the message to determine that the message 140 contains a request for a change in a resource, such as the change in a password, or other account information, or such as the change in a computer name, change in domain, or the like.

The method from the hub domain controller 145 perspective also comprises an act 240 of identifying that the domain controller is authorized. Act 240 includes identifying that the read-only domain controller is authorized to make the request on behalf of an accessor initiating the request. For example, the resource manager 150 at the hub domain controller 145 identifies a partition 155 for the local domain controller A 115, and identifies that the local domain controller is associated with a cacheable group that includes the accessor 103 making the request. Since the local domain controller A 115 can cache the accessor's 103 resources (i.e., 105*a* 105*b*, etc.), the local domain controller A 115 is authorized to send the request 140 on behalf of the accessor. Similarly, therefore, the method from the hub domain controller 145 perspective comprises an act 250 of identifying that the accessor is authorized. Act 250 includes identifying that the accessor is authorized to change the resource. For example, as shown in FIG. 1A, the accessor is associated with a resource 105*a* that is in a partition 160 of cacheable objects for the local domain controller A.

FIG. 2 further shows that the method from the perspective of the hub domain controller 145 comprises an act 260 of changing the resource. For example, upon identifying that the local domain controller 115 and the accessor account are authorized for the request, FIG. 1A shows that the resource manager 150 now has an updated resource (i.e., "Resource+1") for the accessor account, now accessor account 105*b*.

FIG. 2 also shows that the method from the hub domain controller 145 perspective comprises an act 270 of sending a reply that the resource was changed. Act 270 includes sending a reply message to the read-only domain controller that the resource has been changed. For example, as shown in FIG. 1A, hub domain controller 145 sends message 165 to the local domain controller 115, which indicates that the resource 105*a* has been updated successfully to 105*b*. In general, the hub domain controller also sends a copy of the updated resource 105*b* to the local domain controller 115, so that the updated resource 105*b* can be cached locally in cache 125 (e.g., FIG. 1B). In other implementations, however, the hub domain controller might send the updated account 105*b* separately from an indication of success message.

In addition, FIG. 2 shows that the method from the local domain controller perspective comprises an act 280 of caching a copy of the changed resource. Act 280 includes receiving into cache a copy of a changed version of the local resource from the writable hub domain controller. For example, the resource manager 120 at the local domain controller receives message 165, which includes the updated resource 105*b*, and stores the updated resource 105*b* in cache 125 with other cacheable resources or accounts.

In addition, FIG. 2 shows that the method from the local domain controller perspective comprises an act 290 of sending a reply to the accessor. Act 290 includes sending a reply to the accessor that the local resource has been changed, such that the accessor is unaware that the resource was changed at the writable hub domain controller. For example, as shown in FIG. 1A, the local domain controller 115, via the resource manager 120, sends message 170 to the client computer system 100, indicating that the resource 105*a* has been successfully updated to resource 105*b* (i.e., "Resource+1"). At least in part since the messages 110 and 170 were received by or sent from the local domain controller A 115, the accessor 103 (i.e., user, application, or client system 100) is not necessarily aware of the interaction between the local domain controller 115 and the hub domain controller 145.

The schemes and methods described herein therefore provide a number of mechanisms for implementing a domain controller hierarchy such that a local read-only domain controller has the benefits of conventional read-only local domain controllers as well as the benefits of conventional writable local domain controllers. In particular, the domain hierarchy described herein provides security within a local branch office, at least in part since the local domain controller is read-only. The domain hierarchy described herein also provides expected flexibility since the local domain controller is able to chain resource commands (e.g., changes in secure account information) to a writable hub domain controller.

One will appreciate that embodiments of the invention include or are incorporated in computer-readable media having computer-executable instructions or related data structures stored thereon. Examples of computer-readable media or computer program products include the volatile or non-volatile storage media, including but not limited to RAM, ROM, EEPROM, Flash media, CD-ROM, DVD, or other optical or magnetic storage, as well as any corresponding optical or magnetic storage devices, and/or any other media capable of storing electronic computer-executable instructions or related electronic data structures that are capable of being accessed and/or processed by a general purpose or special purpose computerized system. Computer-readable media also encompasses any appropriate combinations of the foregoing.

Computer-executable instructions comprise, for example, general text instructions in the case of scripts, or compiled instructions in the case of compiled program code, and/or relevant data that are read by one or more components of a general purpose or special purpose computerized system. When read, interpreted, and/or executed, these instructions cause one or more processors of the general purpose or special purpose computerized system (or special purpose processing device) to execute a function or group of functions. As such, computer-executable instructions and associated data structures represent an example of program code means for executing the acts or steps of the invention disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. At a read-only domain controller in a computerized system in which the local domain controller communicates information to and from a writable hub domain controller, a method of managing resources through the read-only domain controller such that resources can be updated in a simple and secure manner, comprising the acts of:
   receiving a request from an accessor to change a resource;
   identifying that the request involves a write operation on the resource;
   forwarding the request to a writable hub domain controller;
   receiving into cache a copy of a changed version of the resource from the writable hub domain controller; and
   sending a reply to the accessor that the resource has been changed, such that the accessor is unaware that the resource was changed at the writable hub domain controller.

2. The method as recited in claim 1, wherein the accessor is any of a client computer system, an application installed on the client computer system, or a user.

3. The method as recited in claim 2, wherein the request to change the resource includes any of changing a name of the client computer system on a network, changing a password for the client computer system, or joining a network domain.

4. The method as recited in claim 2, wherein the accessor is a user, and wherein the request includes changing a user name, a password, or a domain change for the user.

5. The method as recited in claim 1, wherein the request is received at the local domain controller by a resource manager configured to manage secure accounts based on one or more policies.

6. The method as recited in claim 5, further comprising:
   identifying a local policy that indicates what resources can be chained and what resources cannot be chained to the writable hub domain controller; and
   identifying that the requested change in the resource is a request that can be chained to the writable hub domain controller.

7. The method as recited in claim 5, further comprising:
   identifying that the request for change in the resource is being handled at a read-only domain controller; and
   identifying that the read-only domain controller cannot complete the requested change in the resource since the request involves the write operation.

8. The method as recited in claim 1, further comprising preparing the request in a new message to be sent to the writable hub domain controller, wherein the new message includes an identifier for the local domain controller.

9. The method as recited in claim 1, further comprising receiving a separate success message from the writable hub domain controller that the requested change was processed successfully, such that the changed resource and the success message are received separately.

10. The method as recited in claim 1, further comprising:
    receiving a new request from the accessor to access the changed version of the resource;
    identifying that the changed version of the resource is stored in cache; and
    granting access to the changed version of the resource, such that the writable hub domain controller is not involved in authenticating the new request.

11. At a writable hub domain controller in a computerized system in which the writable hub domain controller communicates information to and from a read-only domain controller, a method of managing resources such that resources can be updated by one or more accessors in a simple and secure manner through the read-only domain controller, comprising the acts of:
    receiving a request from a read-only domain controller for a change in a resource,
    identifying that the read-only domain controller is authorized to make the request on behalf of an accessor initiating the request;
    identifying that the accessor is authorized to change the resource;
    changing the resource; and
    sending a reply message to the read-only domain controller that the resource has been changed.

12. The method as recited in claim 11, wherein identifying that the read-only domain controller is authorized comprises determining that the resource is cacheable at the read-only domain controller.

13. The method as recited in claim 11, wherein identifying that the accessor is authorized comprises identifying that the accessor is found in a partition of cacheable resources associated with the read-only domain controller.

14. The method as recited in claim 13, wherein identifying that the accessor is authorized further comprises identifying that the resource is associated with the accessor in the partition of cacheable resources.

15. The method as recited in claim 11, wherein sending a reply message that the resource has been changed comprises sending a changed version of the resource to the read-only domain controller, such that the changed version of the resource can be stored in cache at the read-only domain controller.

16. The method as recited in claim 11, further comprising sending local policy information to the read-only domain controller that indicates what resources can be accessed at the writable domain controller through access to the read-only domain controller.

17. The method as recited in claim 11, wherein the accessor is a user or an application installed on a client computer system, the client system being connected to the read-only domain controller.

18. The method as recited in claim 11, wherein the request for a change in a resource comprises a request to change a user password, a computer name, a user name, domain access, file access, or file system access.

19. At a local read-only domain controller in a computerized system in which the local domain controller communicates information to and from a writable hub domain controller, a computer program product having computer-executable instructions stored thereon that, when executed, cause one or more processors of the local read-only domain controller to perform a method comprising the acts of:

receiving a request from an accessor to change a resource;

identifying that the request involves a write operation on the resource;

forwarding the request to a writable hub domain controller;

receiving into cache a copy of a changed version of the resource from the writable hub domain controller; and sending a reply to the accessor that the resource has been changed, such that the accessor is unaware that the resource was changed at the writable hub domain controller.

* * * * *